United States Patent [19]
Goscianski

[11] Patent Number: 4,522,468
[45] Date of Patent: Jun. 11, 1985

[54] INFORMATION DISPLAY DEVICE HAVING A LIQUID CRYSTAL CELL

[75] Inventor: Michel Goscianski, Limeil-Brevannes, France

[73] Assignee: U.S. Philips Corporation, New York, N.Y.

[21] Appl. No.: 47,393

[22] Filed: Jun. 11, 1979

Related U.S. Application Data

[63] Continuation of Ser. No. 812,717, Jul. 5, 1977, abandoned.

[30] Foreign Application Priority Data

Jul. 13, 1976 [FR] France ................. 76 21497

[51] Int. Cl.³ .............................. G02F 1/13
[52] U.S. Cl. .................... 350/332; 350/337; 350/347 E
[58] Field of Search ............. 350/347 E, 337, 332

[56] References Cited

U.S. PATENT DOCUMENTS 3,977,767  8/1976  Okuma et al. ............... 350/335 X
4,097,128  6/1978  Matsumoto et al. .......... 350/335
4,239,349  12/1982  Scheffer ................... 350/337 X Primary Examiner—John K. Corbin
Assistant Examiner—Richard F. Gallivan
Attorney, Agent, or Firm—Paul R. Miller

[57] ABSTRACT

This device uses a cell with liquid crystal provided between polarizers. The polarizing means and analyzing means are constructed and positioned so that the light transmission is zero at a voltage Vm on the cell, said voltage Vm being larger than the voltage which corresponds to the optical threshold of the cell.

The transmission of the cell as a function of the supplied voltage increases considerably above the voltage value Vm.

The device is controlled by means of signal voltages which exceed Vm and which show a small voltage swing, while simultaneously a strong light transmission and a good contrast are obtained, which permits of using an information addressing according to lines and columns when a large number of lines are used.

20 Claims, 7 Drawing Figures

INFORMATION DISPLAY DEVICE HAVING A LIQUID CRYSTAL CELL

This is a continuation of application Ser. No. 812,717, filed July 5, 1977, now abandoned.

The invention relates to an information display device having a cell of nematic liquid crystal between two sets of electrodes, which cell is provided between light-polarising means and light-analysing means, the light transmission through the device being controlled by means of electrical control voltages between the sets of electrodes.

The invention also relates to the application of the display device to realize devices for addressing information arranged according to lines and columns.

Display devices of this type are known from several publications. In these devices, several categories of liquid crystals are used in the form of a cell which is formed by a thin layer of liquid crystal of which each surface is provided with a light-pervious electrode so as to apply a variable electrical field parallel to the thickness. Hereinafter there will be referred to both layer thickness and cell thickness, which means substantially the same.

In the article "A 128×128 electrooptic interface for real time data processing" in "La Revue de Physique Appliquée", volume 10, pp. 143 et seq., May 1075, the liquid crystal used is a homeotropic pattern having a negative dielectric anisotropy ($\epsilon_\parallel < \epsilon_\perp$). The liquid crystal is uniaxial and the optical axis is parallel to the thickness of the cell when the strength of the applied electrical field is zero. The liquid crystal then exerts no influence on the polarisation state of the light which is incident at right angles. Extinction of the light beam between the polariser and the linear analyser is obtained when the polarisation directions of these two are mutually perpendicular. When the layer is subjected to the influence of an electrical field, the field introduces a rotation of the molecules in the layer as a result of the negative dielectric anisotropy of the liquid crystal material ($\epsilon_\parallel < \epsilon_\perp$). As a result of this the incident, linearly polarised light is transformed into elliptically polarised light. In this manner light transmission is obtained between crossed polarisers and the light transmission is maximum when the polarisers enclose angles of 45° on either side of the direction which the axis of the molecules assumes under the influence of the electrical field.

In the article "Electrooptical properties of twisted nematic crystal: an application to voltage-controllable color formation" in "La Revue de Physique Appliquée "Volume 10, p. 147, May 1975 the liquid crystal used is a helical nematic crystal having positive dielectrical anisotropy $\epsilon_\parallel > \epsilon_\perp$. In the absence of an electrical field the direction of the axis of the molecules is the same in any plane parallel to the layer and the direction rotates regularly to the layer and the direction rotates regularly through an angle $\theta$ from one surface of the layer to the other surface. A linearly polarised incident vibration which is parallel to or perpendicular to the direction of alignment of the molecules at the entrance of the cell follows the rotary movement of the center and rotates through the same angle $\theta$ as the molecules of the liquid crystal. The layer used usually correspond to a rotation $\theta = \pi/2$ of the axis of the molecules in such manner that no light is transmitted between parallel polarizers. Under the influence of an electric field the molecules of the liquid crystal rotate, with the crystal obtaining the homeotropic pattern. The linearly polarised light is transformed into elliptically polarised light. In this case there is light transmission between parallel polarisers.

The known display technique of information by means of the cells is based on this phenomena. The light transmission between the polarisers is controlled by means of an information-containing electrical voltage which is applied between the two surfaces of the liquid crystal. The electrical voltage varies between a minimum value and a maximum value. The minimum voltage value corresponds to an optical threshold above which the electrical field is such that the polarisation of the light in the cell varies under the influence of the field, which results in a light transmission variation between the polarisers. A desired property of the devices is the contrast between the transmitted light and the non-transmitted light as a function of the signal amplitude swing or change. The device is better according to whether the contrast is large with small voltage swing or change.

According to the prior art it is difficult to obtain large contrasts with a small control signal swing. As a matter of fact, the increase of transmission of the cell placed between polarisers which are crossed or parallel according to the configuration of the liquid crystal used, does not vary rapidly enough above the threshold dependent on the applied signal. On the other hand, when the cell is used for addressing information according to lines and columns, the useful signal swing depends on the number of scanned lines.

Actually it is known (see, for example, the article "Scanning limitations of Liquid Crystal Display" in "IEEE transactions on electron devices", volume ED 21, Nr. 2, February 1974) that as a result of the fact that the lines are fed sequentially by a voltage $V_1$ and the columns are simultaneously fed by a voltage $V_2$ the positive or negative polarity of which depends upon the presence or absence of information at the crossings with the addressed line, contrast is maximum when the ratio $(V_1/V_2) = \sqrt{n}$ and the ratio of the effective voltages $V_O$ and $V_F$ between the crystal faces in points having information or having no information then have the following relationship with respect to n:

$$\frac{V_O}{V_F} = \left( \frac{\sqrt{n} + 1}{\sqrt{n} - 1} \right)^{\frac{1}{2}}.$$

Since the ratio $V_O/V_F$ varies with the number of lines n according to this relation, it follows herefrom that sufficient contrast (for example larger than 10) is not possible with a large number of lines.

It is the object of the invention to mitigate such drawbacks. For that purpose, instead of using a control signal voltage whose minimum value is smaller than or equal to the optical threshold, a control signal voltage is used whose minimum value is larger than the threshold and corresponds to induction of birefringence in the liquid crystal and hence to a variation of the polarisation of the light which passes through the cell. The polarisation means which precede the cell and on the other hand the analysing means which succeed the cell are placed in such manner that the light transmission is minimum when the value of the signal voltage is minimum, which above the minimum signal voltage value light transmission becomes larger when the voltage increases. The resulting light transmission curve is a curve which shows a much larger slope dependent on the voltage value of the applied signal. The control of the cell may then be carried out by means of a small signal swing or change, for example, in the order of a few tenths of a volt, while the contrast assumes large values. In particular, according to the invention, the information addressing at the crossings of the lines and columns may be effected by means of a large number of lines and with a strong contrast. The invention also permits extinction of the transmitted light at control voltages which are larger than the optical threshold due to the fact that according to the invention transmission is determined by either means for polarising the light at the entrance of the cell, or analysing means of the transmitted light at the output of the cell, or both means simultaneously.

The desired results are either a direct compensation of the induced birefringence in the crystal at the minimum value of the signal voltage used, or a variation of the nature of the polarisation of the incident light at the entrance of the cell, or of the nature of the vibration emanating from the cell, the vibration being afterwards easily extinguished by means of a rectilinear analyser.

When a nematic helical crystal is used, extinction is obtained in a simpler manner by a simple rotation of the rectilinear polarisers and analysers with respect to their usually parallel positions. The measures taken may relate both to operation at normal light incidence on the cell and to an operation with oblique incidence of the light on the cell. In addition, the light beams may have parallel rays or diverge slightly.

The invention will now be described in greater detail with reference to the drawings, in which.

Figure 1:
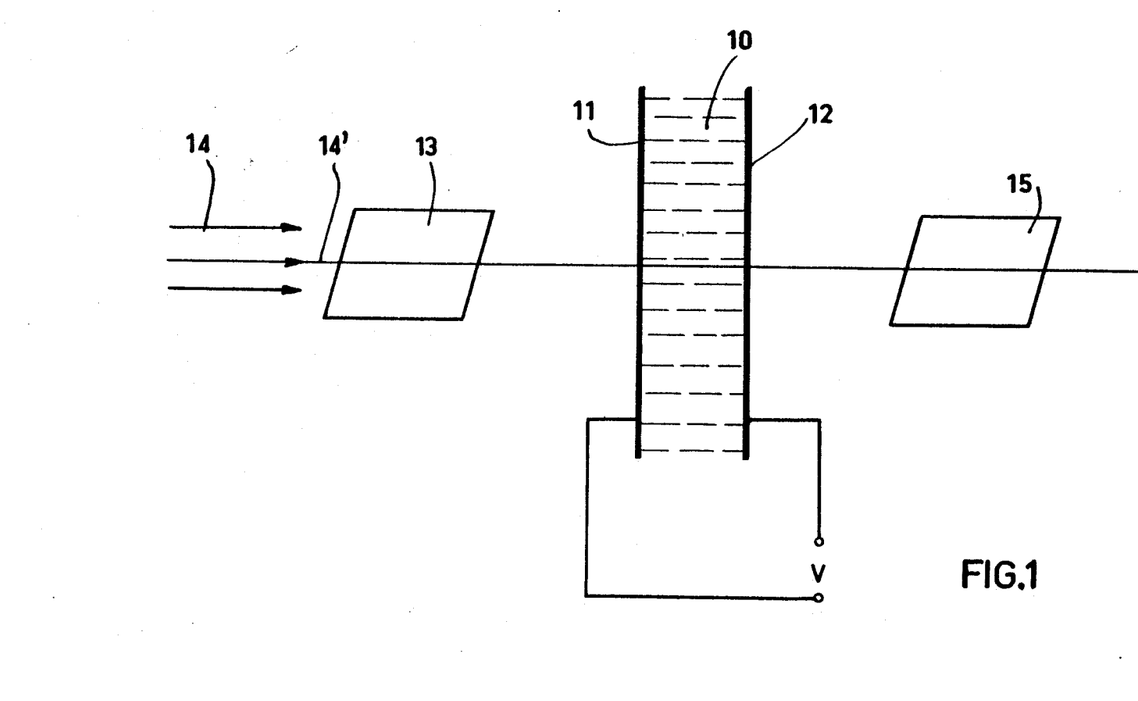
FIG. 1 is a sectional view of a device having a cell with a nematic liquid crystal which is situated between a polariser and an analyser.

In the sectional view of the device shown in FIG. 1, reference numeral 10 denotes a layer of nematic liquid crystal which is placed between two electrodes 11 and 12 between which an electric voltage V is applied. The assembly formed by 10, 11 and 12 is a so-called nematic cell. A polariser 13 polarizes the light beam 14. It is assumed that the central ray 14' of the beam 14 is incident perpendicularly to the nematic cell.

It is indicated hereinafter that according to the invention the beam may be oblique to the cell. An analyser 15 receives the light at the output of the cell.

Figure 2:
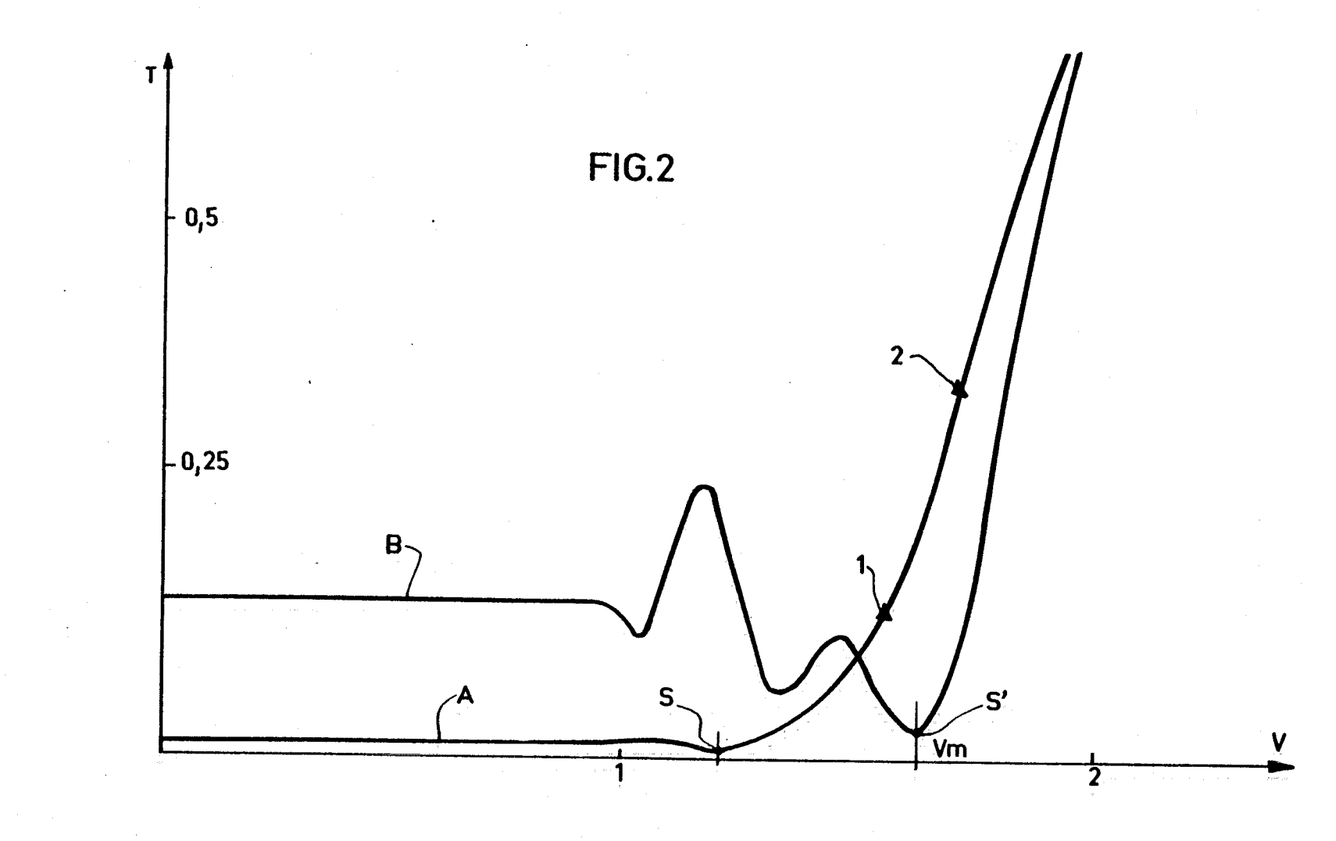
FIG. 2 shows a light transmission curve of a cell with a nematic liquid crystal as a function of the signal voltage between the electrodes with various mutual orientations of the polariser and the analyser.

By way of example, FIG. 2 shows in a rectangular system of axes the curves A and B which represent the variations of the light transmission T of the device as a function of the electrical voltage V which is applied between the electrodes when the liquid crystal has a helical pattern and when the polariser and the analyser are linear; the curves A and B are obtained for two different orientations of the polarizers and analysers.

Figure 3:
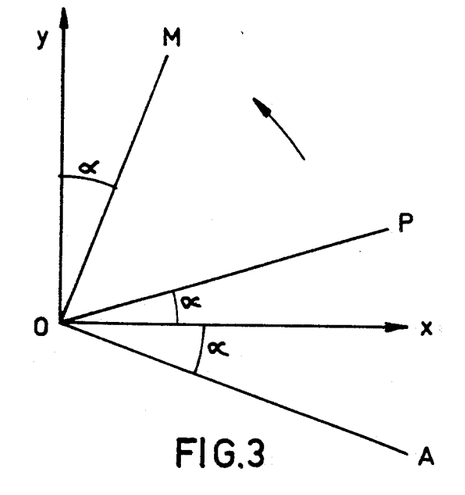
FIG. 3 shows diagrammatically the principle of a first device according to the invention.

For understanding the invention it is assumed by way of example that the nematic cell is such that in the absence of an electrical field applied to the cell, the direction of alignment of the axis of the molecules rotates through an angle $\pi/2$ from one surface of the cell to the other, the axis, however, remaining parallel to the plane of the electrodes. In FIG. 3, ox represents the direction of alignment of the molecules at the input of the cell, and oy denotes the direction of alignment of the molecules at the output of the cell.

Curve A corresponds to the prior art according to which the direction of polarisation of the polariser and the analyser is parallel to ox or oy. In the absence of voltage there is substantially no light transmission and when subsequently the voltage increases, an optical threshold is achieved which is denoted on curve A by the dot S at which polarisation of light is influenced within the cell and thereafter becomes elliptical. Light is then transmitted between parallel polarisers. Above the point S the light transmission does not at least initially vary considerably in accordance with the supplied voltage. The result of this is that upon displaying information with the cell by controlling the light transmission of the cell with a signal voltage which is applied between the electrodes and which comprises the information, only weak contrasts are obtained when the signal voltage swing or change is small and when the minimum value of the signal voltage corresponds to that in point S. For realizing a comparatively large light transmission it is necessary to perform control between the points 1 and 2 which are on the ascending part of the curve A, which means that a minimum light transmission differing from zero should be accepted.

Curve B in FIG. 2 denotes the light transmission which is obtained according to the invention when the polarizers and the analysers are no longer parallel but are each rotated through an angle $\alpha$ on either side of the direction ox. FIG. 3 shows the positions of the polariser and the analyser according to the directions OP and OA, respectively, in the case of a left helical structure. When the voltage is smaller than $V_m$, the cell, up to the optical threshold, shows a light transmission which is not equal to zero. But at a given voltage value Vm which corresponds to the point S' and which is larger than the threshold voltages, the light transmission is substantially zero due to the fact that the vibration emanating at the output of the cell is a substantially rectilinear vibration according to the direction OM which forms an angle $\alpha$ with the direction oy and thus is perpendicular to OA. Above this value the light transmission increases considerably as a function of the applied voltage and with a slope which is much stronger or steeper than the slope when the polariser and the analyser are parallel to ox or oy.

Figure 4:
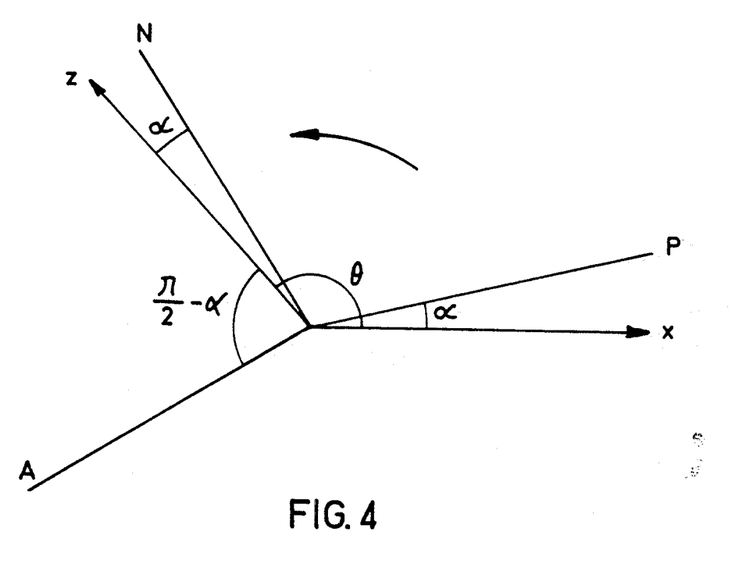
FIG. 4 shows diagrammatically the principle of a second device according to the invention.

Upon displaying information such a cell thus provides a great contrast with a small amplitude swing or change of the control voltage. According to the invention, the nematic cell used may be a cell in which the rotation of the axis of the molecules from one cell surface to the other differs from the value $\pi/2$. In FIG. 4, the direction ox denotes the direction of alignment of the molecules at the input of the cell, and the direction oz which forms an angle $\theta$ with ox denotes the direction of alignment of the molecules at the output of the cell when the voltage is zero. The direction OP represents an incident linearly polarized vibration on the input surface which forms an angle α with the direction ox. At a given value Vm of the voltage applied to the cell, which voltage is larger than the voltage which corresponds to the optical threshold at which the polarisation of the light is influenced within the cell, this delivers at its output a linearly polarised vibration ON which forms the angle $\theta - \alpha$ with ox. According to the invention the cell has a linear polariser with direction OP and an analyser with direction OA, perpendicular to ON, which forms the angle $\pi/2 - \alpha$ with the direction of alignment oz of the molecules at the output of the cell. As a function of the applied voltage, a light transmission curve is then obtained which is analogous to curve B in FIG. 1.

According to a modified embodiment, the angle $\theta = \pi/2 + 2\alpha$. In this case the polariser and the analyser are orientated in the same direction which forms an angle α with ox or with the perpendicular to ox, as shown in FIG. 5.

In the above-described devices left-helical nematic configurations are used. Of course it is also possible for the invention to use configurations in the same manner which are right-helical. In this latter case it is sufficient to rotate the polariser and the analyser in the direction opposite to the direction in which they would have to be rotated when the configuration used is left-helical.

Figure 5:
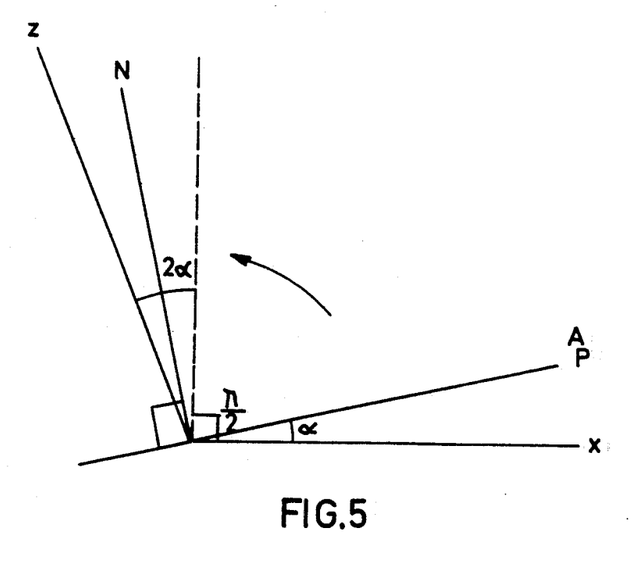
FIG. 5 shows diagrammatically the principle of a third device according to the invention.

More generally the direction which is denoted in FIGS. 3, 4 and 5 by the arrows is chosen as a positive direction of rotation. Taking this assumption into account, with reference to FIG. 3, the angle α is positive for the polariser and is negative for the analyser in the case of a left structure, while the angle α is negative for the polariser and is positive for the analyser in the opposite case. In the case of FIG. 4, the angles α and $\pi/2 - \alpha$ are positive for a left structure but are negative for a right structure, while in the case of FIG. 5 the angle α is positive or negative according as a left structure or a right structure is used.

According to another embodiment of the invention, a steep transmission characteristic of the cell is obtained as a function of the applied signal voltage in a different manner. For this embodiment liquid crystal configurations are used of the type which are either homeotropic with a negative dielectric anisotropy ($\epsilon_\| < \epsilon_\perp$) or are helical ($\epsilon_\| > \epsilon_\perp$). According to the invention, the light is polarised linearly at the input of the cell. Under the influence of a signal applied to the electrodes, a birefringence is induced in the liquid crystal so that at the output thereof the light is elliptically polarised. When the configuration of the cell is homeotropic, according to the invention the analysing means used at the output of the cell comprise in the first instant a birefringing phase shifting plate the neutral lines of which are parallel to the neutral lines which are induced in the liquid crystal by the signal voltage of value Vm, the phase shift caused by the phase shifting plate being equal to and showing the same sign as the phase shift which is caused by the liquid crystal. As a result of this the cell produces at its output a vibration which is linearly polarised. At the output the vibration is extinguished when after the phase shifting plate a linear polarizer is provided perpendicular to the vibration which is supplied by the phase shifting plate. Since the neutral lines of the liquid crystal cell are parallel to the neutral lines of the phase shifting plate, the phase shifts caused by the components are composed algebraically. The sum of the phase shifts is thus independent of the sequence in which the radiation beam passes through the components. Thus the phase shifting plate may be arranged before or behind the liquid crystal cell. According to these two arrangement possibilities a device is obtained for which the light transmission is analogous to the light transmission represented by curve B of FIG. 2, in which the light transmission is zero when the applied signal voltage has the value Vm.

According to a modified embodiment of the invention and for both configuration types (helical and homeotropic), the elliptically polarised variation obtained at the output of the cell is converted into a linearly polarised vibration by means of a λ/4 plate of which the neutral lines are parallel to the axes of the elliptically polarized vibration. A linear analyser is arranged perpendicularly to the resulting linearly polarized vibration. In the case of a homeotropic configuration it is possible to provide the λ/4 plate between the polariser and the cell.

In accordance with the invention, all the above-described devices may be used both for a normal light incidence and for an oblique light incidence. The light beam may also be formed by parallel rays or may be diverging to a certain extent.

In particular, with an oblique light incidence the invention proposes an embodiment in which the configuration for the liquid crystal is homeotropic. This embodiment is shown diagrammatically in a sectional view of FIG. 6, while the operation thereof is shown in FIG. 7.

Figure 6:
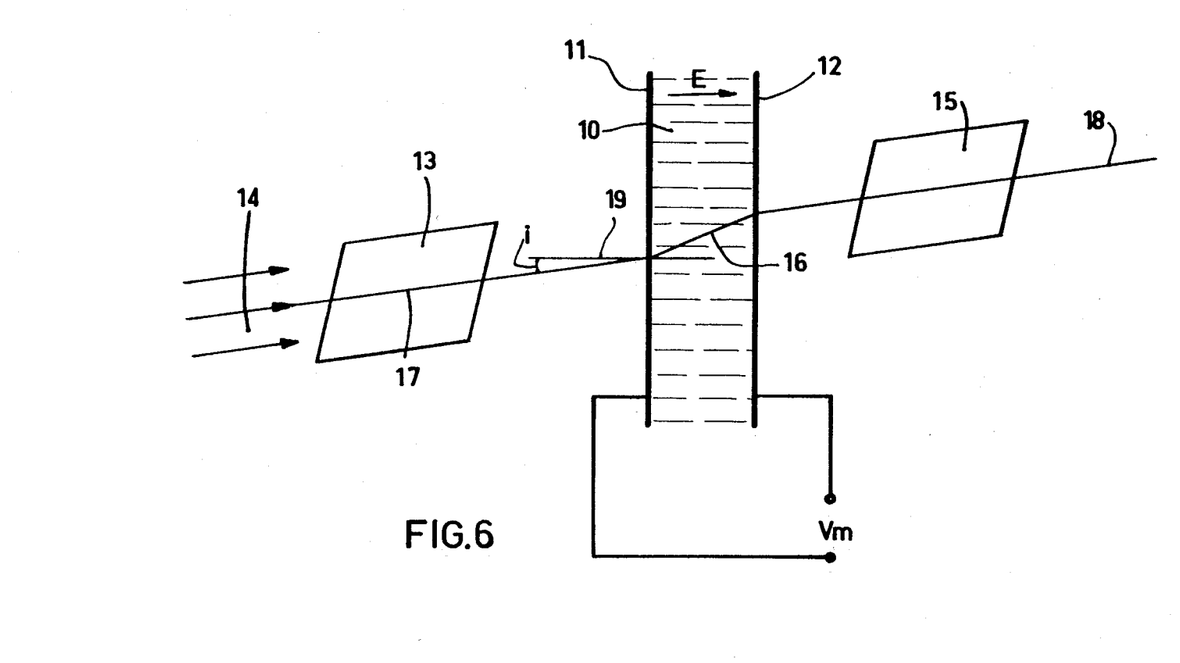
FIG. 6 is a diagrammatic sectional view of a device according to a fourth embodiment of the invention in which obliquely incident light is used, and FIG. 7 finally shows diagrammatically the principle for operation of the device according to the fourth embodiment.
Figure 7:
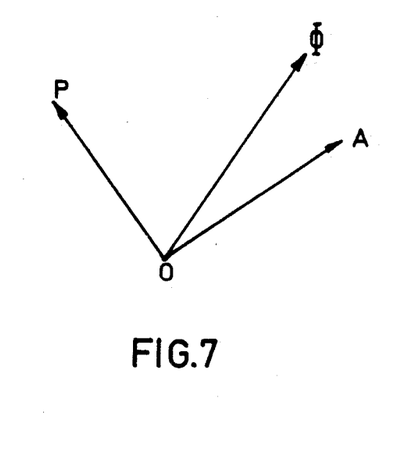

The sectional view shown in FIG. 6 comprises the electrical field E which is applied to the cell and the direction of the light beam. In the sectional view the liquid homeotropic crystal is referenced 10 and the electrodes are referenced 11 and 12. A voltage Vm is applied between the electrodes. According to the invention the light is incident obliquely on the cell according to an angle i with respect to the normal 19 to the cell. This direction of incidence is such that the light within the cell is parallel to the direction of the molecules at the value Vm of the voltage applied between the electrodes. The direction is the direction of the refracted light ray 16 corresponding to the incident ray 17. At the input the device comprises the linear polariser 13 and at the output the linear analyser 15. The analyser and polariser are provided in such manner that their directions of polarisation are mutually perpendicular and that the bisectrix of the directions is parallel to the common direction of the rays 17 and 18 at the input and at the output of the cell. The directions of polarisation are shown in FIG. 7 according to a plane which is perpendicular to the rays 17 and 18. In this figure, Φ denotes the direction of the plane formed by the field E and the direction 16; the direction of vibration passed by the polariser is denoted by OP, while the direction of vibration passed by the analyser is denoted by OA. At the voltage Vm the vibration OP is not influenced by the cell and there is no light transmission whatsoever. At a voltage V which exceeds Vm, the direction of the molecules has changed and it no longer corresponds to the direction 16, while the linear polarisation with direction OP is converted into an elliptically polarised vibration which is passed according to the direction OA. A particular positioning of the polarisers and of the analysers is such that OP and OA form an angle α=45° on either side of Φ, which corresponds to a maximum light transmission at the voltage V>Vm.

A particular structure of these devices is that which enables the display of data according to lines and columns. The n electrodes on each face are realized in agreement with known technology and in the form of two groups of parallel strips. On one surface the direction of the strips differs from that of the strips on the other surface, the strips of one surface, termed lines, being, for example, normal to the strips of the other surface, termed columns. According to the known technology the lines are fed sequentially with a voltage $V_1$ and simultaneously the columns are fed with a voltage $V_2$ the positive or negative polarity of which depends on the presence or absence of information at the crossings with the addressed line.

On the other hand, the voltages $V_1$ and $V_2$ are chosen to be so that the effective voltage $V_F$ between the crystal surfaces in the points without information is approximately equal to the value $V_m$ on the curve B or the analogous curves which are obtained for other embodiments. The effective voltage $V_O$ between the crystal surfaces in the points having information is higher than $V_m$. Due to the steep increase of the light transmission of the device as a function of the applied signal, a very good contrast is obtained for a large number of lines, while the difference between $V_O$ and $V_F$ nevertheless is only a few tenths of a volt.

When, for example, n=128 lines, while $V_O/V_F=1.09$, the value 20 is obtained as a contrast.

An improvement of the display devices forming part of the invention relates to the addition to such a device of a light diffuser arranged behind the analyser so that it is possible to directly observe visually the information displayed at a large angle.

The various cells used in accordance with the invention transmit a light level in the absence of supplied signal voltage. In the case of a display device according to lines and columns, the light transmission may be annoying in the spaces which are present between the conductive and the transparent electrodes. From this it follows that the parasitic average transmission level is added to the transmission levels which correspond to the effective values $V_O$ and $V_F$ of the applied signal, which results in a decrease of the displayed contrast. In order to reduce parasitic transmission and to increase the contrast, according to the invention either an electrically insulating layer which absorbs the light, or a dielectric mirror is provided between the spaces.

The above-described devices are designed for operation with white light. It will be obvious that the light transmission can be better suppressed according as the wavelength range of the display light is smaller. According to the invention, a filter is added to the input and to the output of said devices which passes only a part of the light spectrum.

What is claimed is:

1. An information display device comprising a display cell including a nematic liquid crystal and electrodes at opposite sides of said nematic liquid crystal, means for applying at least a minimum voltage Vm between said electrodes, said minimum voltage Vm being greater than the threshold voltage at which polarization of light begins to be influenced in said cell, and means including polarization means for obtaining minimum optical transmission of said cell at said minimum voltage Vm.

2. A device according to claim 1, wherein said nematic liquid crystal has a homeotropic configuration and a negative dielectric anisotropy ($\epsilon_\parallel < \epsilon_\perp$), said liquid crystal having an optical axis that is perpendicular to said electrodes in the absence of an applied voltage.

3. A device according to claim 2, wherein said polarization means include a linear polarizer at an optical input side of said cell, and a phase shifting plate and linear polarizing analyzer at an optical output side of said cell, said phase shifting plate having neutral lines that are parallel to neutral lines of said liquid crystal which are induced at said voltage Vm, so that elliptically polarized light from said liquid crystal is converted into linearly polarized light, and said linear analyzer being oriented with a polarization direction which is normal to said linearly polarized light.

4. A device according to claim 2, wherein said polarization means include a linear polarizer and a phase shifting plate at an optical input side of said cell, and a linear polarizing analyzer at an optical output side of said cell, said phase shifting plate having neutral lines that are parallel to neutral lines of said liquid crystal which are induced at said voltage Vm, so that elliptically polarized light from said liquid crystal is converted into linearly polarized light, said linear analyzer being oriented with a polarization direction which is at right angles to said linearly polarized light.

5. A device according to claim 2, wherein said polarization means include a linear polarizer and a quarter wavelength phase shifting plate at an optical input side of said cell, and a linear polarizing analyzer at an optical output side of said cell, said linear analyzer being oriented with a polarization direction which is perpendicular to linearly polarized light obtained at said output side of said cell at said voltage Vm.

6. A device according to claim 2, wherein light is directed obliquely in said cell, parallel to the molecular direction of said nematic liquid crystal at said voltage Vm, and wherein said polarization means include a linear polarizer at an optical input side of said cell and a linear polarizing analyzer at an optical output side of said cell, said polarizer and analyzer having respective polarization directions that form angles of 45° with a plane defined by said molecular direction of said liquid crystal at said voltage Vm and the electric field direction in said cell, said polarization directions having a bisectrix which is parallel to said molecular direction.

7. A device according to claim 1, wherein said polarization means include a linear polarizer at an optical input side of said cell, and a quarter wavelength phase shifting plate and linear polarizing analyzer at an optical output side of said cell, said quarter wavelength plate having neutral lines that are parallel to neutral lines of said liquid crystal which are induced at said voltage Vm, said linear polarizing analyzer being oriented with a polarization direction which is perpendicular to linearly polarized light at the output of said quarter wavelength plate.

8. A device according to claim 1, wherein said nematic liquid crystal has a helical configuration with directions of molecular axes being approximately parallel to said electrodes in the the absence of a voltage and rotating through an angle $\theta$ from one liquid crystal surface to an opposite liquid crystal surface.

9. A device according to claim 8, wherein said angle $\theta$ is equal to $\pi/2$ radians.

10. A device according to claim 9, wherein said polarization means include a linear polarizer at an optical input side of said cell and a linear polarizing analyzer at an optical output side of said cell, said polarizer and analyzer having respective polarization directions which are at an angle $\alpha$ to said directions of molecular axes at respective input and output sides of said cell, said angle α being positive for said polarizer and being negative for said analyzer in the case of a left helical configuration, and said angle α being negative for said polarizer and being positive for said analyzer in a right helical configuration.

11. A device according to claim 8, wherein said polarization means include a linear polarizer having polarization directions that form an angle α with said direction of molecular axes at an optical input side of said cell, and a linear polarizing analyzer having polarization directions that form an angle $\pi/2 - \alpha$ with said direction of moelcular axes at an optical output side of said cell, said angle α being positive for said polarizer and being negative for said analyzer in a left helical configuration, and said angle α being negative for said polarizer and being positive for said analyzer in a right helical configuration.

12. A device according to claim 11, wherein said angle θ is equal to $\pi/2 + 2\alpha$.

13. A device according to claim 1, wherein light is incident normal to said cell.

14. A device according to claim 1, wherein light is incident obliquely in said cell.

15. A device according to claim 1, wherein a light diffuser is provided an an output side.

16. A device according to claim 1, wherein said electrodes are formed on each side of said cell by parallel conductive strips which are electrically insulated from each other, said strips at one side of said cell being perpendicular in direction to said strips at an opposite side of said cell.

17. A device according to claim 16, wherein a light reflective mirror is provided in spaces between said conductive strips.

18. A device according to cliam 16, wherein a light absorbing and electrically insulating layer is provided in spaces between said conductive strips.

19. A device according to claim 16, wherein information is addressed to said cell by sequentially supplying a voltage $V_1$ to said strips at one side of said cell and by simultaneously supplying a voltage $V_2$ to said strips at said opposite side of said cell, said voltage $V_2$ having a polarity which depends on information being present at areas where said strips at opposite sides of said cell cross, and wherein said voltages $V_1$ and $V_2$ have values to generate an effective voltage $V_F$ equal to said minimum voltage Vm at said areas which are free of information.

20. A device according to claim 1, wherein an optical filter is provided optically adjacent to said cell.

* * * * *